United States Patent
Jepsen

(10) Patent No.: US 10,280,526 B2
(45) Date of Patent: May 7, 2019

(54) SYSTEM FOR PRODUCTION OF A STERILIZING SOLUTION

(71) Applicant: D&T Consult ApS, Sønderborg (DK)

(72) Inventor: Hardy Peter Jepsen, Sønderborg (DK)

(73) Assignee: DANISH CLEAN WATER A/S, Sønderborg (DK)

(*) Notice: Subject to any disclaimer, the term of this patent is extended or adjusted under 35 U.S.C. 154(b) by 0 days.

(21) Appl. No.: 15/172,062

(22) Filed: Jun. 2, 2016

(65) Prior Publication Data
US 2016/0362802 A1    Dec. 15, 2016

(30) Foreign Application Priority Data

Jun. 9, 2015   (EP) .................................... 15171218

(51) Int. Cl.
| | |
|---|---|
| C25B 9/10 | (2006.01) |
| C25B 1/00 | (2006.01) |
| C25B 1/04 | (2006.01) |
| C25B 9/00 | (2006.01) |
| C25B 9/08 | (2006.01) |
| C02F 1/42 | (2006.01) |

(Continued)

(52) U.S. Cl.
CPC ................. *C25B 9/08* (2013.01); *C02F 1/42* (2013.01); *C02F 1/4674* (2013.01); *C25B 1/26* (2013.01); *C25B 15/02* (2013.01); *C25B 15/08* (2013.01); *C02F 9/005* (2013.01); *C02F 2201/4618* (2013.01); *C02F 2201/46115* (2013.01); *C02F 2209/005* (2013.01); *C02F 2209/40* (2013.01); *C02F 2303/04* (2013.01); *C02F 2303/16* (2013.01)

(58) Field of Classification Search
CPC .. C25B 9/08; C25B 15/08; C25B 9/10; C25B 1/00; C25B 1/04; C25B 9/00; C02F 1/4695; C02F 2201/46115

USPC ........................................................ 204/263
See application file for complete search history.

(56) References Cited

U.S. PATENT DOCUMENTS

| | | |
|---|---|---|
| 2007/0007146 A1 | 1/2007 | Childers, II et al. |
| 2012/0228145 A1 | 9/2012 | Guastella et al. |

FOREIGN PATENT DOCUMENTS

| | | |
|---|---|---|
| DE | 10 2005 049169 A1 | 4/2006 |
| JP | H06 206074 A | 7/1994 |
| JP | H07 31979 A | 2/1995 |

OTHER PUBLICATIONS

Extended European Search Report, dated Oct. 29, 2015, for European Patent Application No. EP 15171218.9; 7 pages.

(Continued)

*Primary Examiner* — Zulmariam Mendez
(74) *Attorney, Agent, or Firm* — Knobbe, Martens, Olson & Bear, LLP

(57) ABSTRACT

A system that produces a sterilizing solution, has an electrolytic cell containing an anode compartment and a cathode compartment separated by a porous ion-exchange membrane. The system further has an ion-exchange water softener arranged to supply the electrolytic cell with deionized water and a brine tank arranged to supply the electrolytic cell with a sodium chloride brine solution. The system is arranged for conducting a regeneration of the water softener by use of a sodium chloride brine solution from the brine tank. The system has a positive displacement pump controlled by a control unit of the system to selectively supply a sodium chloride brine solution from the brine tank to the electrolytic cell and to the water softener for regeneration thereof.

9 Claims, 1 Drawing Sheet

(51) Int. Cl.
    *C02F 1/467*     (2006.01)
    *C25B 1/26*     (2006.01)
    *C25B 15/02*     (2006.01)
    *C25B 15/08*     (2006.01)
    *C02F 9/00*     (2006.01)

(56) References Cited

OTHER PUBLICATIONS

Communication Pursuant to Article 94(3) EPC, dated Dec. 8, 2017, in European Patent Application No. 15171218.9.
Orbio Technologies 5000-Sc Cleaning Solution Generator Parts Manual, 2012.
Kinetico 2020c compact water softener, 2002.
Kinetico—2040s OD Non-Electric, High Performance Water Conditioning System, 2012.
Kinetico Water Systems, Kinetico's Valve, 2015.
DCW Danish Clean Water, DCW T25 Generator Manual, 2008.
Delta Water Engineering, Installation Guide Duplex External/Duet, 2009.
Delta Water Engineering, Service & Regeneration, Step by Step. Original publication date unknown. Version submitted herewith printed on Oct. 30, 2018.

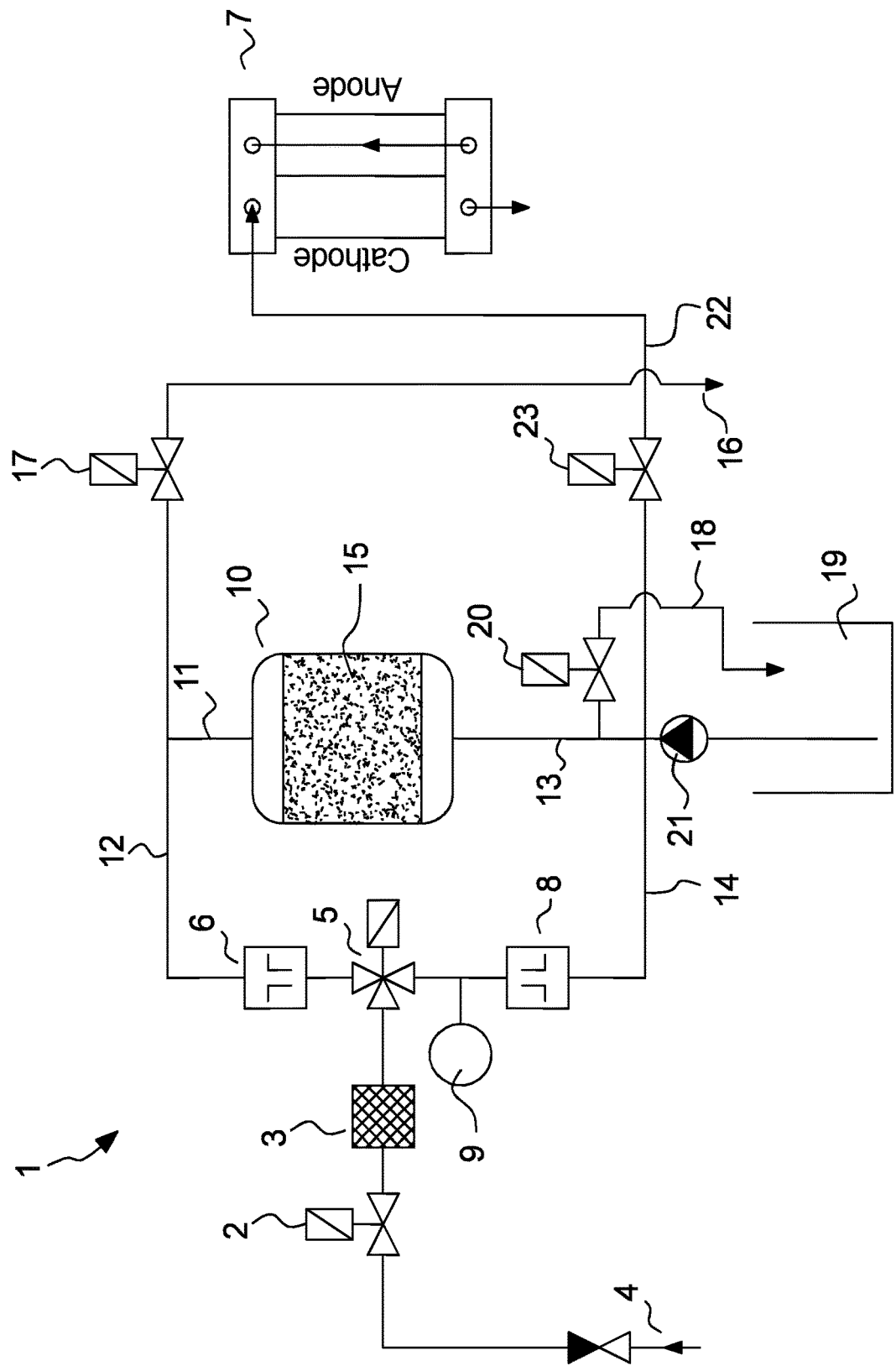

SYSTEM FOR PRODUCTION OF A STERILIZING SOLUTION

PRIORITY AND CROSS REFERENCE TO RELATED APPLICATIONS

This application claims the benefit of European Application No. EP 15171218.9, filed on Jun. 9, 2015, which is hereby incorporated by reference in its entirety.

BACKGROUND

The present invention relates to a system for production of a sterilizing solution by means of a diaphragm or membrane electrolytic cell which from water and a sodium chloride brine solution produces a sterilizing solution.

SUMMARY

The present invention relates to a system for production of a sterilizing solution, such as hypochlorous acid, sodium hypochlorite or a mixture thereof, comprising an electrolytic cell containing an anode compartment and a cathode compartment separated by a porous ion-exchange membrane, the system further comprising a ion-exchange water softener arranged to supply the electrolytic cell with deionized water and a brine tank arranged to supply the electrolytic cell with a sodium chloride brine solution, the system being arranged for conducting a regeneration of the water softener by use of a sodium chloride brine solution from the brine tank, wherein the system comprises a positive displacement pump controlled by a control unit of the system to selectively supply a sodium chloride brine solution from the brine tank to the electrolytic cell and to the water softener for regeneration thereof.

The ion-exchange water softener preferably contains an ion-exchange resin in form of beads of e.g. 0.3 to 1 millimeters in diameter of a well-known type with surface capacity to bind calcium and magnesium ions, which may be replaced with sodium ions if the resin is regenerated by flushing it with a concentrated aqueous solution of sodium chloride.

The brine tank is preferably arranged to contain a saturated sodium chloride brine solution and may comprise more compartments for generating the brine from deionized water and solid sodium chloride and for storage of the saturated brine for supplying it to use in the electrolytic cell and in the water softener.

By providing the system with only one common pump for the brine solution, which is controlled by the control unit to selectively supply the brine to the electrolytic cell when that is required during production of the sterilizing solution and to the water softener for regeneration thereof, it may be ensured that proper regeneration of the water softener is performed as opposed to known systems, where a separate regeneration brine pump, such as a venturi pump is applied. A separate regeneration brine pump may malfunction for one reason or the other, whereas a malfunction of the common brine pump of the present invention also will prevent the electrolytic cell to function properly, which can easily be detected from the electric current through the cell during production of the sterilizing solution. Thus, insufficient regeneration of the water softener which would result in production water for the electrolytic cell that contains too high concentrations of calcium and magnesium ions that may clog the porous membrane of the electrolytic cell is largely prevented.

The brine pump of the system is a positive displacement pump, such as e.g. a membrane pump, a peristaltic pump or a gear pump. A membrane pump driven by means of a solenoid or an electric motor is preferred.

The control unit may control the selective supply by means of controlling various valves of the system as well as the operation of the brine pump itself.

The flow rate of the saturated brine for the electrolytic cell and for the regeneration of the water softener is generally of different order of magnitude, the brine flow for the electrolytic cell during production mode being much less that the brine flow required for the regeneration of the water softener, and it is therefore preferred that the flow rate of the brine pump is adjustable by means of the control unit. The ratio of the highest flow rate to the lowest flow rate during operation of the system depends on the design of the system, in particular the capacity of the water softener to the capacity of the electrolytic cell and the speed with which the water softener should be regenerated. However, it is particularly preferred that the flow rate of the brine pump is adjustable within a ratio of the highest flow rate to the lowest flow rate during operation of the system of at least 2, more preferred of at least 5, and most preferably of at least 20, i.e. that the highest brine flow provided by the pump during regeneration of the water softener is at least 2 times, such as at least 5 times the brine flow provided by the pump to the electrolytic cell during production of the sterilizing solution.

The control unit is adapted for operating the system in a production mode, where deionized water from the water softener and sodium chloride brine solution from the brine tank is supplied to the electrolysis cell and a regeneration mode, where sodium chloride brine solution is supplied from the brine tank to the water softener.

The control unit is preferably adapted for selectively operating the system in a production mode, where deionized water from the water softener and sodium chloride brine solution from the brine tank is supplied to the electrolysis cell and a regeneration mode, where sodium chloride brine solution is supplied from the brine tank to the water softener, i.e. it is preferred that the selection of and switching between production and regeneration mode is made by the control unit.

The system comprises preferably a pressure switch with a set-point pressure below the pressure limit of the electrolysis cell, where the pressure switch is connected to the control unit for providing an output accordingly, so that the control unit can apply the output in the control of the system. The pressure switch is arranged to sense the pressure of the flow of water to the electrolysis cell in the production mode of the system and the same pressure switch is arranged to sense an inlet water pressure of the system in the regeneration mode of the system due to the differences in the flow in the system in the two operating modes. The pressure switch is used to ensure that the electrolytic cell is not subjected to an excessive pressure, the limit for the cell typically being around 3 bars, as well as to ensure that the pressure is high during the regeneration process which indicates that all valves of the system operates correctly. By using the same pressure switch it is subjected to varying high and low pressure when the operational mode is changed between production mode and regeneration mode, whereby the function of the pressure switch is verified as the two pressures will be above and below the pressure set-point of the pressure switch, respectively.

The water softener is furthermore preferably arranged to supply deionized water to the brine tank.

BRIEF DESCRIPTION OF THE DRAWINGS

FIG. 1 shows a diagram representation of an example of a system according to the present invention.

DETAILED DESCRIPTION

The systems for producing sterilizing solutions are well-known in the art, see e.g. European patent No. EP 2 361 227 B1, for the production of a sterilizing or disinfecting aqueous solution which is typically applied for cleaning of industrial food processing systems. Other such systems are disclosed in British patent application No. GB 2 316 090 A and in U.S. Pat. No. 4,329,215.

The electrolytic cell itself as well as the control of the operation of the cell and the use of the output from the cell can take various forms that are all within the scope of the present invention.

It is a general element of the systems as disclosed in the mentioned documents that the water fed to the electrolytic cell is softened, such as by means of a ion-exchange water softener, the reason being that the cathode compartment of the electrolytic cell may be clogged by the presence of calcium and magnesium ion in the process water. In order to regenerate the water softener, i.e. to remove the calcium and magnesium ions from the surface of the resin component in the softener, it is necessary to flush the water softener with a solution of sodium chloride in water, and a common supply of a saturated salt brine solution for the electrolytic process as well as for the regeneration of the ion-exchange water softener may be provided.

It is an object of the present invention to provide such system for the production of a sterilizing solution by electrolysis of sodium chloride containing water wherein the reliability of the system is improved.

FIG. 1 shows a diagram of a system 1 according to the present invention. The system 1 is provided with an inlet valve 2 and an inlet water filter 3 for connecting the system 1 to an external water supply 4. The water from the inlet valve 2 flows to a 3/2-ways control valve 5 which in a first, production position directs the water to the production control valve 6 which ensures a substantially constant flow to the electrolysis cell 7 during production, or in a second, regeneration position directs the water to the regeneration control valve 8 which is also a constant flow valve. A pressure sensor 9 is arranged between the 3/2-ways control valve 5 and the regeneration control valve 8, the pressure sensor 9 being a pressure switch that detects the pressure to be above or below a set-point value of about 2 bar.

The ion-exchange water softener tank 10 is arranged with a first connection 11 to the tube 12 from the production control valve 6 and a second connection 13 to the tube 14 from the regeneration control valve 8. The water softener tank 10 contains resin beads 15 of a known type on the surface of which calcium ions $Ca^{2+}$ and magnesium ions $Mg^{2+}$ in water flowing through the tank 10 will bind and thus soften the water. The tube 12 from the production control valve 6 is connected to a drain outlet 16 with an on-off drain valve 17.

A refill connection 18 is arranged from the second connection 13 of the softening tank 10 to the brine tank 19 to supply softened water to generate more saturated salt brine in the brine tank 19 and the refill connection 18 is provided with a refill valve 20. The brine tank 19 is manually provided with solid sodium chloride when needed, so that the brine in the tank 19 is a saturated solution of sodium chloride. A brine pump 21 is arranged to provide brine from the brine tank 19 to the second connection 13 of the softening tank 10. The second connection 13 of the softening tank 10 is also connected to the electrolysis cell 7 by means of a production connection 22 which is controlled by a production valve 23. A control unit (not shown) comprising Programmable Logic Controller (PLC) is provided for controlling the operation of the system 1, including the operation of the 3/2-way control valve 5, the production control valve 6, the regeneration control valve 8, the drain valve 17, the refill valve 20 and the production valve 23 as well as the operation of the brine pump 21. The control unit controls the operation by means of input received from the operation of the electrolysis cell and the pressure sensor 9.

The system 1 is arranged to be operated in two modes, a production mode and a regeneration mode.

In the production mode the 3/2-way valve 5 is positioned to allow for water flow towards the production control valve 6. The drain valve 17 is closed so the water will flow through the softener tank 10 where most calcium and magnesium ions in the water will be captured by the surface of the resin beads in the softener tank 10. The production valve 23 is also open and allows the softened water to continue towards the electrolysis cell 7. The brine pump 21 is operated at a low volume flow to add saturated salt brine from the brine tank 19 to the softened water for the electrolysis cell 7. In an example, the electrolysis cell 7 receives 9 liter softened water per hour with 35 ml salt brine added. The electrolysis cell 7 producing the sterilizing solution is of a well-known type described extensively in the art and comprises an anode compartment and a cathode compartment separated by a porous ion-exchange membrane.

The operation of the electrolysis cell 7 provides information for the control unit that are utilized to control the operation of the system 1. The electrolysis current is proportional to the concentration of salt in the process water received via the production connection 22. The current will indicate that the brine tank 19 and the pump 21 is operation satisfactory or not, e.g. that a new supply of solid sodium chloride to the brine tank 19 is required. This will also ensure that the brine in the brine tank 19 is of a satisfactory quality of regeneration of the resin beads in the softener tank 10.

Initially in a production sequence of the system 1, the 3/2-way control valve is positioned shortly to open towards the regeneration control valve 8 while the drain valve 17 as well as the production valve 23 is closed so that the pressure sensor is exposed to the inlet pressure of the water supply. The output from the pressure sensor 9 to the control unit will confirm that the inlet pressure is sufficient, normally higher than 3 bars, and that the pressure switch of the pressure sensor 9 operates correctly as the inlet pressure is above the set point of the pressure switch of about 2 bars. This set point is applied to protect the electrolysis cell 7 in production mode of the system 1. If the output from the pressure sensor is satisfactory, the control unit change the relevant valve settings to production mode as described above. The pressure loss in the water flow through the production control valve 6 and the softener tank 10 ensures that the pressure under normal operational conditions at the pressure sensor 9 will be below the set point and the pressure switch with provide an output accordingly to the control unit. This procedure provides a check of the function of the pressure sensor 9, i.e. that it shifts correctly between the two outputs and that the pressure switch is not stuck to provide a false positive output that the pressure is below the set point. The electrolysis cell 7 is pressure sensitive and an overpressure of the magnitude of the inlet water pressure to the system 1 due to e.g. a blocked outlet from the electrolysis cell 7 could possibly damage the cell 7 in case the pressure sensor 9 does not provide the correct output to the control unit.

The regeneration mode is initiated when the control unit from a pre-set value for the hardness of the water supplied to the system 1 and the operating time of the system 1 since last regeneration and/or the output from a flow meter (not shown) finds that the resin beads 15 in the water softener tank 10 requires regeneration to maintain the ability to soften the water for the production. The production valve 23 is placed in a closed position whereas the drain valve 17 is open. The 3/2-way control valve 5 open for water flow towards the regeneration control valve 8 and the brine pump 21 is operated to a high volume flow, for the previously discussed example to a flow rate of 3 liter brine per hour for a volume of 0.8 liters of resin beads 15. The water flow with the brine enters the softener tank 10 through the second connection, pass the resin beads 15 in the tank 10 where the sodium ions replace the calcium and magnesium ions and the waste water passes via the drain valve 17 to the drain outlet 16. After a predetermined period of time, the operation of the brine pump 21 is halted, the softener tank 10 is flushed with pure water and the 3/2-way control valve and the drain valve 17 are closed. The resin beads 15 in the softening tank 15 now regenerated and the system 1 is ready for operating in production mode. During the regeneration mode of the system 1, the pressure sensor 9 provides an output to the control unit that the water pressure is above the set point, thus indicating that the valves 5, 17, 23 are operating correctly.

Brine pump 21 is a positive displacement pump, in particular a solenoid driven membrane pump.

The operation of the refill valve 20 is controlled by means of a level sensor (not shown) in the brine tank 19, and the control unit will open the refill valve 20 in case the level sensor provides an output indicating a low level of salt brine in the brine tank 19 and the system 1 is operating in production mode, so that the brine tank 19 is refilled with softened water from the softener tank 10.

Alternatively, the system 1 of the present invention may comprise a series of electrolysis cell 7 to increase the production of the sterilizing solution. Alternatively or additionally, the system 1 may comprise two or more water softener tanks 10 which are regenerated in turns, whereby a constant production of the sterilizing solution may be provided.

REFERENCES

1 System
2 Inlet valve
3 Inlet water filter
4 External water supply
5 3/2-way control valve
6 Production control valve
7 Electrolysis cell
8 Regeneration control valve
9 Pressure sensor
10 Water softener tank
11 First connection from water softener tank
12 Connection from production control valve
13 Second connection from water softener tank
14 Connection from regeneration control valve
15 Resin beads
16 Drain outlet
17 Drain valve
18 Refill connection
19 Brine tank
20 Refill valve
21 Brine pump
22 Production connection
23 Production valve

What is claimed is:

1. A system for production of a sterilizing solution, the system comprising:
    an electrolytic cell comprising an anode compartment and a cathode compartment separated by a porous ion-exchange membrane;
    an ion-exchange water softener configured to supply the electrolytic cell with deionized water and a brine tank configured to supply the electrolytic cell with a sodium chloride brine solution; and
    a control unit configured to control a common positive displacement pump, wherein the common positive displacement pump is configured to selectively supply the sodium chloride brine solution from the brine tank to the electrolytic cell and to the water softener,
    wherein the system is configured for regenerating the water softener using the sodium chloride brine solution supplied from the brine tank by the common positive displacement pump,
    wherein the control unit is configured for operating the system in a production mode, wherein deionized water from the water softener and the sodium chloride brine solution from the brine tank is supplied to the electrolysis cell, and a regeneration mode, wherein the sodium chloride brine solution is supplied from the brine tank to the water softener, and wherein the control unit is configured to select and switch between the production mode and the regeneration mode, and
    wherein the system comprises a pressure switch with a set-point pressure below a pressure limit of the electrolysis cell and connected to the control unit for providing an output accordingly, wherein the pressure switch is arranged to sense a pressure of the flow of water to the electrolysis cell in the production mode, and wherein the same pressure switch is arranged to sense an inlet water pressure of the system in the regeneration mode of the system.

2. The system according to claim 1, wherein the control unit is configured to adjust a flow rate of the positive displacement pump.

3. The system according to claim 2, wherein the flow rate of the pump is adjustable by the control unit within a ratio of a highest flow rate to a lowest flow rate during an operation of the system of at least 20.

4. The system according to claim 1, wherein the control unit is configured for operating the system in a production mode, wherein deionized water from the water softener and the sodium chloride brine solution from the brine tank is supplied to the electrolysis cell, and a regeneration mode, wherein the sodium chloride brine solution is supplied from the brine tank to the water softener, and wherein the control unit is configured to select and switch between the production mode and the regeneration mode.

5. The system according to claim 1, comprising a pressure switch with a set-point pressure below a pressure limit of the electrolysis cell and connected to the control unit for providing an output accordingly, wherein the pressure switch is arranged to sense a pressure of the flow of water to the electrolysis cell in the production mode, and wherein the same pressure switch is arranged to sense an inlet water pressure of the in the regeneration mode of the system.

6. The system according to claim 1, wherein the water softener is further configured to supply deionized water to the brine tank.

7. The system according to claim 2, wherein the flow rate of the pump is adjustable within a ratio of a highest flow rate to a lowest flow rate during operation of the system of at least 5.

8. The system according to claim 2, wherein the flow rate of the pump is adjustable within a ratio of a highest flow rate to a lowest flow rate during operation of the system of at least 2.

9. The system according to claim 2, wherein the control unit is configured for operating the system in a production mode, wherein deionized water from the water softener and the sodium chloride brine solution from the brine tank is supplied to the electrolysis cell, and a regeneration mode, wherein the sodium chloride brine solution is supplied from the brine tank to the water softener.

* * * * *